July 26, 1938.  O. C. BETRY  2,125,216
FUEL TEMPERATURE REGULATOR AND DISTRIBUTOR
Filed Aug. 8, 1936
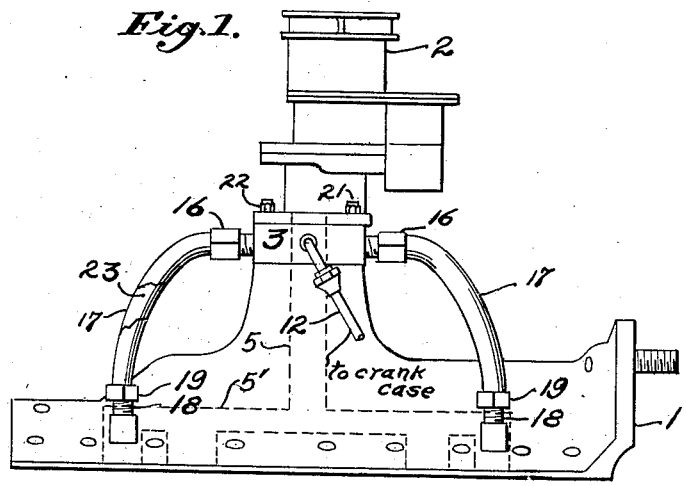
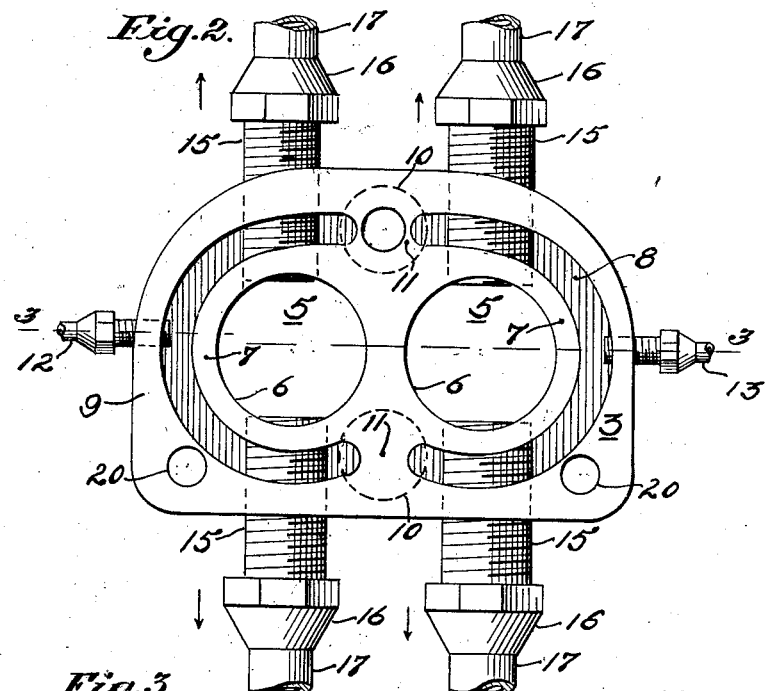
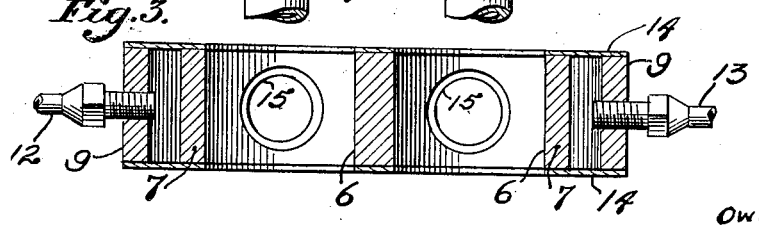
Inventor:
Owen C. Betry.
Raymond Jones.
Att'y.

Patented July 26, 1938

2,125,216

UNITED STATES PATENT OFFICE 2,125,216

FUEL TEMPERATURE REGULATOR AND DISTRIBUTOR

Owen Charles Betry, Glendale, Calif.

Application August 8, 1936, Serial No. 95,009

5 Claims. (Cl. 123—122)

My invention relates to a novel fuel temperature regulator and distributor adapted for use on gas engines, and has particular reference to a device that may be installed on existing types of engines and which has the double function of permitting the temperature of the gas supply to be either raised or lowered and, at the same time, provides a means for bypassing a portion of vaporized gasoline from the carburetor directly to each end cylinder.

In the present day types of multiple cylinder gas engines using ordinary intake manifolds, it has been found that the end cylinders particularly are starved in that they do not receive the same proportion of gas as do the other cylinders with the result that a uniform application of power to the various cranks of the crank shaft is not obtained. It is a well known fact, also, that the temperature of the vaporized fuel within the manifold varies in a wide range in accordance with the ambient air temperature and is, at times, too hot and, at other times, too cool for efficient operation of the engine. According to my invention, an apparatus is provided that functions both to more properly distribute the fuel to the various cylinders and to control the temperature of this fuel.

The main object of my invention is to provide a means which is readily adapted for installation on existing engines in a manner to permit an auxiliary or shunt supply of gas to each end cylinder.

Another object is to provide a means for heating or cooling the fuel feed according to the temperature of the crank case oil and for heating cool crank case oil.

Another object is to provide a single attachment to an existing carburetor that functions both to permit fuel feed to each end cylinder as well as to permit control of the temperature of the fuel feed and crank case oil.

A further object is to provide an attachment of the nature described that is efficient in operation, economical to manufacture, simple to install, and which is automatic in operation.

For a full disclosure of the invention, reference is made to the accompanying drawing, wherein—

Figure 1 shows the device as associated with the carburetor and intake manifold;

Fig. 2 is a top plan view of the device; and

Fig. 3 is a view in section on line 3—3 of Fig. 2.

Referring to the drawing in detail, the invention is shown as applied to a duplex manifold 1 of a V-8 motor which is provided with a carburetor 2 indicated in a conventional manner. The essential feature of my invention comprises a device 3, preferably a casting, which is adapted to be inserted between the intake neck 4 of the manifold and the base of the carburetor. The manifold shown is adapted to supply opposed banks of cylinders and the intake neck is provided with two vertical conduits 5, one for each bank of cylinders leading to the horizontal manifold passage 5'.

Referring to Fig. 2, the casting 3 is formed to provide a pair of gas intake conduits 6 which are surrounded by a thin wall 7. An oil reservoir 8 is also formed between the outer wall or shell 9 of the casting. The reservoir is made arcuate at each side of the conduits 6 and, as shown by dotted lines 10, the arcuate portions are connected by circular passages which lie under bridge portions 11. These circular passages will permit greater heat passage through the wall 7 and the bridge portions 11 serve to attach the wall 7 to the shell 9.

Oil is pumped from the crank case through a feed pipe 12 into one end of the reservoir 8 and along divided paths on each side of conduits 6, through passages 10 and may leave the shell 9 by way of outlet conduit 13 which leads back to the crank case. A pair of gaskets 14 are used to seal off each face of casting 3 and to close reservoir 8 above and below.

A series of four nipples 15 is tapped through walls 9 and 7 in a manner to communicate with gas conduits 6. The four nipples are connected by fittings 16 to four conduits 17 which are tapped into the manifold at points opposite each of the four end cylinders. Nipples 18 and fittings 19 serve to connect each gas conduit 17 to the tapped manifold inlets. The device or casting 3 is provided with three bolt openings 20 which receive the three stud bolts 21 which extend from the manifold neck 4 and nuts 22 serve to hold the carburetor 2 and the device 3 in position on the manifold. In Fig. 1, a front or side conduit 17 is shown as broken away to show another conduit 17 in rear thereof connected to the opposite side of the manifold. The manifold shown is intended to represent a standard Ford V-8 manifold and is formed with a gas passage on opposite sides of its central vertical plane, there being a separate passage for feeding each of the two banks of cylinders.

In operation, gas is drawn downwardly from the carburetor 2 through conduits 6 to feed each of the two separate manifold branches or conduits. Portions of the gas are by-passed from conduits 6 directly through each conduit 17 into each end cylinder. At the same time, oil is pumped in from oil conduit 12, through reservoir 8, to substantially surround each conduit 6 thence out through outlet pipe 13 and back to the crank case in a manner to heat or cool the incoming stream of gas, depending upon the temperature of such gas with respect to that of the crank case oil.

It will be noted that the casting 3 is a simple unit which has provision for both varying the temperature of the gas and for bypassing gas to each end cylinder. This unit may be installed readily between the carburetor and intake manifold of any known type of gas engine. While I have shown its use on a duplex manifold and a V-type engine, it may be modified for use on a manifold that supplies gas to an engine having a single line of cylinders.

Considering the action of the gas conduits 17 and gas chambers 6—6, this arrangement permits the creation of a heavy gas disturbance in these chambers which results in an increase in the degree of vaporization of the liquid fuel to form a drier gas. This disturbance is due to the successive alternate reactions due to suction caused by the pistons which are communicated from the extreme ends of the manifold to the gas in the conduits 17 and in the chambers or downtake conduits 6, with the desirable result that the vapors are more violently agitated in a manner to produce a more efficient and increased degree of vaporization of the liquid particles. By arranging the conduits in opposite pairs close to the carburetor, a complete reversal of the pull on the vapors as it leaves the orifice of the throttle chamber of the carburetor is secured.

It is a well known fact that the end cylinders of a bank of cylinders are not properly supplied with gas when the common type of manifold is employed with the result that these end cylinders are starved and the pistons therein do not deliver their share of engine power. By the use of my invention, an increased flow of gas to the end cylinders is brought about and, at the same time, a more highly vaporized form of gas is supplied thereto with the novel result that the engine will deliver a more uniform power to the crank shaft at an increased speed and improvement in pickup. Furthermore, a more lean adjustment of the carburetor may be used with a lower consumption of gas.

Under certain operating conditions, it will be found that the gas supply is too hot for efficient operation of the engine. By permitting crank case oil to surround the chambers 6, such high temperatures are reduced to the desirable low temperature of that oil. Under other conditions, the gas supply may be too cool and heat exchange from the oil through the walls 7 will increase the temperature of this cooler gas and improve the operating conditions. In other words, the temperature of this gas is maintained more nearly uniform at about crank case oil temperature.

Another desirable result secured is that of heating the relatively cool crank case oil upon starting the engine. In the winter time particularly, appreciable time is consumed after starting the engine to heat up the crank case oil. While this oil is relatively cool, it produces a drag on the engine and loss of power as well as a starvation of lubrication of cylinders and bearings.

By my invention, the cool crank case oil is circulated by or through the heated part of the engine in a manner to warm this oil up immediately. As soon as the engine has become warm and the carburetor properly functioning, the action is reversed and the oil is actually cooled or maintained at a desirable low temperature due to the fact that heat therefrom is transmitted to the relatively cooler gas which is being fed to the manifold.

While I have disclosed a preferred form of the invention, it is to be understood that various modifications and equivalents are contemplated such as may be embraced within the scope of the appended claims.

I claim:

1. An adapter casing adapted to be secured in operative position between a carburetor and a manifold and having a gas conduit therein for passage of gas to the manifold, a heat exchange wall surrounding said gas conduit, an oil reservoir positioned to surround the heat exchange wall, a peripheral wall positioned to surround the oil reservoir, means for supplying crank case oil to said reservoir, and pairs of gas outlet conduits extending through said wall and reservoir and communicating at one end with said gas conduits the other end of each outlet conduit communicating with the manifold adjacent an extreme end thereof.

2. In a gas engine having cylinders, a carburetor, and an intake manifold, an adapter casing secured to and between the carburetor and the manifold, a gas conduit in said casing for passing gas to the manifold, means for by-passing gas directly to each end cylinder comprising auxiliary conduits connected each at one end to said first named conduit and at the other end to the manifold at points adjacent each end cylinder, an oil reservoir formed within said casing adjacent to and in heat exchange relation with said first named conduit and means to circulate oil from the crank case, through said reservoir and back to the crank case.

3. In a device as set forth in claim 2 wherein the conduits which by-pass gas to each end cylinder are positioned to extend through the oil reservoir in heat exchange relation with the oil therein.

4. In a gas engine having opposed banks of cylinders, a carburetor, and a duplex intake manifold, an adapter casing secured to and between the carburetor and the manifold, a pair of gas conduits within said casing for feeding gas to the respective inlet passages in the manifold, a heat exchange wall positioned around each conduit, an oil reservoir positioned adjacent each conduit, said wall forming the inner side wall of the reservoir, a peripheral wall forming the outer wall of the reservoir, means to pass crank case oil into said reservoirs, and pairs of by-pass conduits one for each cylinder bank, each conduit of each pair communicating at one end with said first named gas conduit and being connected at its other end to the manifold at a point adjacent a respective end cylinder.

5. A device as set forth in claim 4 wherein each by-pass conduit is positioned to extend through the oil reservoir in heat exchange relation with the oil therein.

OWEN CHARLES BETRY.